United States Patent
Shimizu et al.

(10) Patent No.: US 9,988,477 B2
(45) Date of Patent: Jun. 5, 2018

(54) (METH) ACRYLIC BLOCK COPOLYMER AND PROCESS FOR PRODUCING THE SAME

(71) Applicant: KURARAY CO., LTD., Kurashiki-shi (JP)

(72) Inventors: Seiya Shimizu, Tsukuba (JP); Hirotsugu Ida, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days. days.

(21) Appl. No.: 14/767,676

(22) PCT Filed: Mar. 5, 2014

(86) PCT No.: PCT/JP2014/055570
§ 371 (c)(1),
(2) Date: Aug. 13, 2015

(87) PCT Pub. No.: WO2014/148251
PCT Pub. Date: Sep. 25, 2014

(65) Prior Publication Data
US 2016/0002378 A1    Jan. 7, 2016

(30) Foreign Application Priority Data
Mar. 18, 2013 (JP) ................................ 2013-054528

(51) Int. Cl.
| C08F 220/10 | (2006.01) |
| C08F 220/20 | (2006.01) |
| C08F 297/02 | (2006.01) |
| C09D 153/00 | (2006.01) |
| C09J 153/00 | (2006.01) |
| C08F 299/00 | (2006.01) |
| C08F 4/52 | (2006.01) |
| C08F 222/10 | (2006.01) |

(52) U.S. Cl.
CPC .............. *C08F 220/10* (2013.01); *C08F 4/52* (2013.01); *C08F 297/026* (2013.01); *C08F 299/00* (2013.01); *C09D 153/00* (2013.01); *C09J 153/00* (2013.01); *C08F 220/20* (2013.01); *C08F 2222/1013* (2013.01)

(58) Field of Classification Search
CPC .................. C08F 220/10; C08F 220/20; C08F 2222/1013; C08F 297/026
See application file for complete search history.

(56) References Cited

U.S. PATENT DOCUMENTS

| 4,414,370 A | 11/1983 | Hamielec et al. |
| 4,529,787 A | 7/1985 | Schmidt et al. |
| 5,010,166 A | 4/1991 | Scholsky et al. |
| 6,555,637 B1 * | 4/2003 | Hamada ............... C08F 297/02 |
| | | 526/186 |
| 9,051,398 B2 * | 6/2015 | Tanabe ..................... C08F 4/56 |
| 2009/0209726 A1 | 8/2009 | Matsumoto et al. |
| 2010/0210805 A1 | 8/2010 | Shirai et al. |
| 2011/0098413 A1 | 4/2011 | Matsumoto et al. |
| 2014/0194546 A1 * | 7/2014 | Matsumoto ............ C09J 7/0221 |
| | | 522/50 |

FOREIGN PATENT DOCUMENTS

| JP | 59 6207 | 1/1984 |
| JP | 1 313522 | 12/1989 |
| JP | 2011 184678 | 9/2011 |
| WO | 2005 116098 | 12/2005 |
| WO | 2009 028212 | 3/2009 |
| WO | WO 2012/165623 A1 * | 12/2012 |
| WO | WO 2013/141105 * | 9/2013 |

OTHER PUBLICATIONS

Kilian et al., J. Polymer Sci. A, 41 (2003) 3083-3093.*
Hatada et al., Polymer International 49 (2000) 11-47.*
Kilian et al., "Syntheses and Cleavage of Core-Labile Poly (Alkyl Methacrylate) Star Polymers", Journal of Polymer Science: Part A, vol. 41, (2003), pp. 3083-3093.
Industrial Material, vol. 47, No. 10, (Oct. 1999), pp. 106-109.
International Search Report dated Jun. 3, 2014 in PCT/JP14/055570 Filed Mar. 5, 2014.
Extended European Search Report dated Oct. 5, 2016 in Patent Application No. 14767540.9.
K. Hatada et al., "Structurally Controlled Polymerizations of Methacrylates and Acrylates", Polymer International, vol. 49, No. 1, XP055302337, Jan. 1, 2000, pp. 11-47.

* cited by examiner

*Primary Examiner* — Roberto Rabago
(74) *Attorney, Agent, or Firm* — Oblon, McClelland, Maier & Neustadt, L.L.P.

(57) ABSTRACT

A (meth)acrylic block copolymer includes a methacrylic polymer block including at least one structural unit derived from a dimethacrylate according to formula (2):

$$R^1 \underset{\underset{O}{\|}}{\overset{\overset{O}{\|}}{C}} \cdot O - (CH_2)_n \underset{R^3}{\overset{R^2}{\underset{|}{C}}} - O - \underset{\underset{O}{\|}}{\overset{\overset{}{}}{C}} R^1 \quad (2)$$

where $R^1$ is a methyl group, $R^2$ and $R^3$ are each independently a hydrocarbon group having 1 to 6 carbon atoms, and n is an integer of 1 to 5, and a (meth)acrylic polymer block having no active energy ray curable groups. A method of preparing the (meth)acrylic block copolymer and an active energy ray curable composition are provided.

12 Claims, No Drawings

(METH)ACRYLIC BLOCK COPOLYMER AND PROCESS FOR PRODUCING THE SAME

TECHNICAL FIELD

The present invention relates to (meth)acrylic block copolymers useful as active energy ray curable materials. Specifically, the invention relates to (meth)acrylic block copolymers which may be cured with active energy rays to give cured products that can be softened when subjected to hygrothermal conditions and can be easily separated for disposal.

BACKGROUND ART

Active energy ray curable materials are known which may be cured by the irradiation with active energy rays such as ultraviolet rays and electron beams. Such curable materials are used in applications including adhesives, pressure-sensitive adhesives, paints, inks, coating materials, rapid prototyping materials, mobile teeth fixing materials, denture base materials and composite resins.

Meanwhile, (meth)acrylic block copolymers including methacrylic polymer blocks and acrylic polymer blocks have excellent properties such as tackiness, forming properties and weather resistance. These characteristics are expected to broaden the use of the copolymers to applications such as pressure-sensitive adhesives, adhesives, coating materials, various forming materials, mobile teeth fixing materials, denture base materials and composite resins.

Further, (meth)acrylic block copolymers that include methacrylic polymer blocks and acrylic polymer blocks and have active energy ray curable functional groups are known to exhibit the combined properties of the above types of materials (see Patent Literature 1).

However, the use of such (meth)acrylic block copolymers as active energy ray curable materials sometimes encounters difficulties in separating the cured products for disposal. In, for example, adhesive or coating applications where the materials are applied onto substrates and cured with active energy rays, difficult separation is encountered due to the cured products being hardly removed from the substrates.

CITATION LIST

Patent Literature

Patent Literature 1: JP-A-2011-184678

SUMMARY OF INVENTION

Technical Problem

It is therefore an object of the invention to provide (meth)acrylic block copolymers which may be cured with active energy rays and which are such that when the copolymers are applied as adhesives, coating materials or the like onto substrates and cured with active energy rays, the cured products can be easily removed and separated from the substrates as required such as when the products are to be disposed of. Another object is to provide processes for producing such copolymers.

Solution to Problem

The present invention achieves the above objects by providing the following:

[1] A (meth)acrylic block copolymer including a methacrylic polymer block (A) having at least one or more active energy ray curable groups represented by General Formula (1) below, and a (meth)acrylic polymer block (B) having no active energy curable groups (hereinafter, the copolymer will be written as "block copolymer (X)"),

[Chem. 1]

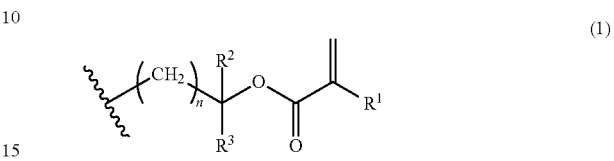

(1)

(wherein $R^1$ is a methyl group, $R^2$ and $R^3$ are each independently a hydrocarbon group having 1 to 6 carbon atoms, and n is an integer of 1 to 5).

[2] A process for producing the block copolymer (X) including:

a step (1) of anionically polymerizing a methacrylate ester in the presence of an organolithium compound, a tertiary organoaluminum compound and at least one Lewis base selected from the group consisting of ethers and tertiary polyamines, the methacrylate ester including 5 to 100 mol % of a dimethacrylate (2) represented by General Formula (2) below:

[Chem. 2]

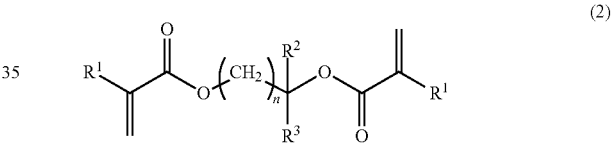

(2)

(wherein $R^1$, $R^2$, $R^3$ and n are as defined above), the tertiary organoaluminum compound containing a chemical structure represented by General Formula (3) below in the molecule:

$$\text{Al—O—Ar} \quad (3)$$

(wherein Ar is an aromatic ring); and a step (2) of adding and anionically polymerizing a mono(meth)acrylate after the step (1).

[3] The process for producing the block copolymer (X) described in [2], wherein the step (2) includes:

a step (2-1) of adding and anionically polymerizing a monomethacrylate after the step (1); and a step (2-2) of adding and anionically polymerizing a monoacrylate after the step (2-1).

[4] The process for producing the block copolymer (X) described in [2] or [3], wherein the process further includes:

a step (3) of adding and anionically polymerizing a methacrylate ester after the step (2), the methacrylate ester including 5 to 100 mol % of a dimethacrylate (2) represented by General Formula (2) above.

[5] An active energy ray curable composition including the (meth)acrylic block copolymer described in [1].

Advantageous Effects of Invention

The block copolymers (X) and the compositions containing the copolymers may be cured with active energy rays.

When the copolymers or the compositions are applied as adhesives, coating materials or the like onto substrates and cured with active energy rays, the cured products can be easily removed and separated from the substrates by a method such as a hygrothermal degradation method as required such as when the products are to be disposed of.

DESCRIPTION OF EMBODIMENTS

The present invention will be described in detail hereinbelow.

A block copolymer (X) includes a methacrylic polymer block (A) having at least one or more active energy ray curable groups represented by General Formula (1) below:

[Chem. 3]

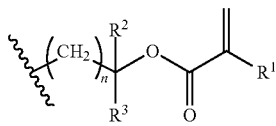
(1)

(wherein $R^1$, $R^2$, $R^3$ and n are as defined hereinabove).

The block copolymer (X) also includes a (meth)acrylic polymer block (B) having no active energy ray curable groups.

Examples of the hydrocarbon groups with 1 to 6 carbon atoms represented by each of $R^2$ and $R^3$ in the formula include alkyl groups such as methyl group, ethyl group, n-propyl group, isopropyl group, n-butyl group, isobutyl group, sec-butyl group, t-butyl group, 2-methylbutyl group, 3-methylbutyl group, 2-ethylbutyl group, 3-ethylbutyl group, 2,2-dimethylbutyl group, 2,3-dimethylbutyl group, n-pentyl group, neopentyl group, n-hexyl group, 2-methylpentyl group and 3-methylpentyl group; cycloalkyl groups such as cyclopropyl group, cyclobutyl group, cyclopentyl group and cyclohexyl group; and aryl groups such as phenyl group. Of these, methyl group and ethyl group are preferable from the viewpoints of active energy ray curability and hygrothermal degradation properties.

The hydrocarbon groups with 1 to 6 carbon atoms represented by $R^2$ and $R^3$ may have substituents.

The substituents are not particularly limited as long as the substituents do not deteriorate the active energy ray curability and the hygrothermal degradation properties of the active energy ray curable groups. Examples thereof include alkoxy groups such as methoxy group, ethoxy group, isopropoxy group and t-butoxy group; and halogen atoms such as chlorine atom and bromine atom.

The methacrylic polymer block (A) preferably includes structural units formed by the addition polymerization of a vinyl compound having an active energy ray curable group represented by General Formula (1) below and another ethylenic double bond (hereinafter, the compound will be written as "active energy ray curable monomer") wherein the polymerization takes place via the ethylenic double bonds.

[Chem. 4]

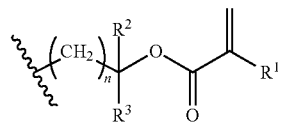
(1)

(In the formula, $R^1$, $R^2$, $R^3$ and n are as defined hereinabove.)

Examples of the active energy ray curable monomers include dimethacrylates (2) represented by General Formula (2) below:

[Chem. 5]

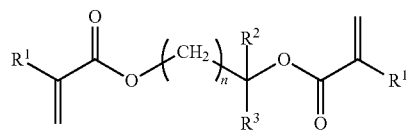
(2)

(In the formula, $R^1$, $R^2$, $R^3$ and n are as defined above.)

In the methacrylic polymer block (A), the content of the structural units derived from the dimethacrylate (2) is preferably in the range of 5 to 100 mol %, more preferably in the range of 10 to 80 mol %, and still more preferably in the range of 20 to 70 mol % relative to all the structural units forming the methacrylic polymer block (A). The dimethacrylates (2) may be used singly, or two or more may be used in combination.

The methacrylic polymer block (A) may contain structural units derived from a monomethacrylate. Examples of the monomethacrylates include methyl methacrylate, ethyl methacrylate, n-propyl methacrylate, isopropyl methacrylate, n-butyl methacrylate, t-butyl methacrylate, cyclohexyl methacrylate, 2-ethylhexyl methacrylate, isobornyl methacrylate, lauryl methacrylate, dodecyl methacrylate, trimethoxysilylpropyl methacrylate, N,N-dimethylaminoethyl methacrylate, N,N-diethylaminoethyl methacrylate, 2-methoxyethyl methacrylate, phenyl methacrylate, naphthyl methacrylate, 2-(trimethylsilyloxy)ethyl methacrylate and 3-(trimethylsilyloxy)propyl methacrylate. Of these, those alkyl methacrylate esters in which the alkyl group has 5 or less carbon atoms are preferable, with examples including methyl methacrylate, ethyl methacrylate, propyl methacrylate, isopropyl methacrylate, n-butyl methacrylate and t-butyl methacrylate. The monomethacrylates may be used singly, or two or more may be used in combination.

In the methacrylic polymer block (A), the content of the structural units derived from the monomethacrylate is preferably in the range of 0 to 95 mol %, more preferably in the range of 20 to 90 mol %, and still more preferably in the range of 30 to 80 mol % relative to all the structural units forming the methacrylic polymer block (A).

The methacrylic polymer block (A) may contain structural units derived from a monomer other than the dimethacrylate (2) and the monomethacrylate. Examples of such additional monomers include acrylate esters such as methyl acrylate, ethyl acrylate, n-propyl acrylate, isopropyl acrylate, n-butyl acrylate, t-butyl acrylate, cyclohexyl acrylate, 2-ethylhexyl acrylate, isobornyl acrylate, lauryl acrylate, dodecyl acrylate, trimethoxysilylpropyl acrylate, N,N-dimethylaminoethyl acrylate, N,N-diethylaminoethyl acrylate, 2-methoxyethyl acrylate, phenyl acrylate, naphthyl acrylate, 2-(trimethylsilyloxy)ethyl acrylate and 3-(trimethylsilyloxy) propyl acrylate; α-alkoxyacrylate esters such as methyl α-methoxyacrylate and methyl α-ethoxyacrylate; crotonate esters such as methyl crotonate and ethyl crotonate; 3-alkoxyacrylate esters such as 3-methoxyacrylate esters; acrylamides such as N-isopropylacrylamide, N-t-butylacrylamide, N,N-dimethylacrylamide and N,N-diethylacrylamide; methacrylamides such as N-isopropylmethacrylamide, N-t-butylmethacrylamide, N,N-dimethylmethacrylamide and N,N-diethylmethacrylamide; methyl 2-phenylacrylate, ethyl 2-phenylacrylate, n-butyl 2-bromoacrylate, methyl 2-bromomethylacrylate, ethyl 2-bromomethylacrylate, methyl vinyl ketone, ethyl vinyl ketone, methyl isopropenyl ketone and ethyl isopropenyl ketone. The additional monomers may be used singly, or two or more may be used in combination.

In the methacrylic polymer block (A), the content of the structural units derived from the additional monomer is preferably not more than 10 mol %, and more preferably not more than 5 mol %.

The number average molecular weight of the methacrylic polymer block (A) is not particularly limited. From viewpoints such as the handling properties, the fluidity and the mechanical characteristics of the obtainable block copolymer (X), the number average molecular weight is preferably in the range of 500 to 1,000,000, and more preferably in the range of 1,000 to 300,000.

The block copolymer (X) includes a (meth)acrylic polymer block (B) having no active energy ray curable groups.

In the specification, the active energy ray curable groups are not particularly limited and may be any functional groups exhibiting polymerizability upon irradiation with active energy rays. Examples include functional groups having an ethylenic double bond (in particular, an ethylenic double bond represented by the general formula $CH_2=CHR—$ (wherein R is an alkyl group or a hydrogen atom)) such as (meth)acryloyl groups, (meth)acryloyloxy groups, vinyl groups, allyl groups, vinylether groups, 1,3-dienyl groups and styryl groups; epoxy groups, oxetanyl groups, thiol groups, maleimide groups and hydrolyzable silyl groups.

The (meth)acrylic polymer block (B) includes structural units derived from a (meth)acrylate ester. Examples of the (meth)acrylate esters include monoacrylates such as methyl acrylate, ethyl acrylate, n-propyl acrylate, isopropyl acrylate, n-butyl acrylate, t-butyl acrylate, cyclohexyl acrylate, 2-ethylhexyl acrylate, isobornyl acrylate, lauryl acrylate, dodecyl acrylate, trimethoxysilylpropyl acrylate, N,N-dimethylaminoethyl acrylate, N,N-diethylaminoethyl acrylate, 2-methoxyethyl acrylate, phenyl acrylate, naphthyl acrylate, 2-(trimethylsilyloxy)ethyl acrylate and 3-(trimethylsilyloxy) propyl acrylate; and monomethacrylates such as methyl methacrylate, ethyl methacrylate, n-propyl methacrylate, isopropyl methacrylate, n-butyl methacrylate, t-butyl methacrylate, cyclohexyl methacrylate, 2-ethylhexyl methacrylate, isobornyl methacrylate, lauryl methacrylate, dodecyl methacrylate, trimethoxysilylpropyl methacrylate, N,N-dimethylaminoethyl methacrylate, N,N-diethylaminoethyl methacrylate, 2-methoxyethyl methacrylate, phenyl methacrylate, naphthyl methacrylate, 2-(trimethylsilyloxy)ethyl methacrylate and 3-(trimethylsilyloxy)propyl methacrylate. Those alkyl acrylate esters in which the alkyl group has 4 or more carbon atoms are preferable, with examples including n-butyl acrylate, t-butyl acrylate, 2-ethylhexyl acrylate, lauryl acrylate and dodecyl acrylate, or those alkyl methacrylate esters in which the alkyl group has 6 or more carbon atoms are preferable, with examples including 2-ethylhexyl methacrylate, lauryl methacrylate and dodecyl methacrylate. The (meth)acrylate esters may be used singly, or two or more may be used in combination.

In the (meth)acrylic polymer block (B), the content of the structural units derived from the (meth)acrylate ester is preferably not less than 90 mol %, and more preferably not less than 95 mol % relative to all the structural units forming the (meth)acrylic polymer block (B).

The (meth)acrylic polymer block (B) may include structural units derived from a monomer other than the (meth) acrylate ester. Examples of such additional monomers include α-alkoxyacrylate esters such as methyl α-methoxyacrylate and methyl α-ethoxyacrylate; crotonate esters such as methyl crotonate and ethyl crotonate; 3-alkoxyacrylate esters such as 3-methoxyacrylate esters; acrylamides such as N-isopropylacrylamide, N-t-butylacrylamide, N,N-dimethylacrylamide and N,N-diethylacrylamide; methacrylamides such as N-isopropylmethacrylamide, N-t-butylmethacrylamide, N,N-dimethylmethacrylamide and N,N-diethylmethacrylamide; methyl vinyl ketone, ethyl vinyl ketone, methyl isopropenyl ketone and ethyl isopropenyl ketone. The additional monomers may be used singly, or two or more may be used in combination.

In the (meth)acrylic polymer block (B), the content of the structural units derived from the additional monomer is preferably not more than 10 mol %, and more preferably not more than 5 mol %.

The number average molecular weight of the (meth) acrylic polymer block (B) is not particularly limited. From viewpoints such as the handling properties, the fluidity and the mechanical characteristics of the obtainable block copolymer (X), the number average molecular weight is preferably in the range of 3,000 to 5,000,000, and more preferably in the range of 5,000 to 1,000,000.

The block copolymer (X) is a block copolymer in which at least one methacrylic polymer block (A) and at least one (meth)acrylic polymer block (B) are bonded to each other. The numbers of the respective polymer blocks and the order of bonding are not particularly limited. From the viewpoint of the easiness in the production of the block copolymer (X), the copolymer is preferably a diblock copolymer which includes one methacrylic polymer block (A) and one (meth) acrylic polymer block (B) bonded to each other, or a triblock copolymer in which one methacrylic polymer block (A) is bonded to each of the ends of one (meth)acrylic polymer block (B).

The block copolymer (X) may be composed of the methacrylic polymer block (A) and the (meth)acrylic polymer block (B) in any ratio without limitation. Preferably, the content ratio of the methacrylic polymer block (A) to the (meth)acrylic polymer block (B) is 90:10 to 5:95 (by mass). Good curability with respect to active energy rays may be advantageously obtained when the copolymer includes 5 mass % or more of the methacrylic polymer block (A) having an active energy ray curable group. On the other hand, good viscoelasticity may be advantageously obtained when the content of the (meth)acrylic polymer block (B) is 10 mass % or more.

The number average molecular weight of the block copolymer (X) as a whole is not particularly limited. From viewpoints such as the handling properties, the fluidity and the mechanical characteristics of the block copolymer (X), the number average molecular weight is preferably 4,000 to 3,000,000, and more preferably 7,000 to 2,000,000.

A process for producing the block copolymer (X) according to the present invention includes a step (1) in which a methacrylate ester including 5 to 100 mol % of a dimethacrylate (2) is anionically polymerized in the presence of an organolithium compound, a tertiary organoaluminum compound and at least one Lewis base selected from the group consisting of ethers and tertiary polyamines. The tertiary organoaluminum compound contains in the molecule a chemical structure represented by General Formula (3) below:

Al—O—Ar (3)

(wherein Ar is an aromatic ring).

The dimethacrylate (2) is polymerized selectively via the methacryloyl group that is not the one bonded to the carbon atom to which $R^2$ and $R^3$ are bonded. The methacryloyl group that is bonded to the carbon atom to which $R^2$ and $R^3$ are bonded is restrained from the polymerization and remains as a side chain of the resultant block copolymer (X). The step (1) may involve one, or two or more kinds of the dimethacrylates (2).

The methacrylate esters used in the step (1) may include a monomethacrylate. Examples of the monomethacrylates include methyl methacrylate, ethyl methacrylate, propyl methacrylate, isopropyl methacrylate, n-butyl methacrylate, t-butyl methacrylate, cyclohexyl methacrylate, 2-ethylhexyl methacrylate, isobornyl methacrylate, lauryl methacrylate, dodecyl methacrylate, trimethoxysilylpropyl methacrylate, N,N-dimethylaminoethyl methacrylate, N,N-diethylaminoethyl methacrylate, 2-methoxyethyl methacrylate, phenyl methacrylate, naphthyl methacrylate, 2-(trimethylsilyloxy)ethyl methacrylate and 3-(trimethylsilyloxy)propyl methacrylate. The monomethacrylates may be used singly, or two or more may be used in combination.

In the methacrylate esters subjected to anionic polymerization in the step (1), the molar ratio of the dimethacrylate (2) to the monomethacrylate is in the range of 5:95 to 100:0, preferably in the range of 10:90 to 80:20, and more preferably in the range of 20:80 to 70:30 from the viewpoint of high polymerization rate as well as from the viewpoints of the active energy ray curability and the hygrothermal degradation properties of the obtainable block copolymer (X).

The methacrylate esters used in the step (1) may include a monomer other than the dimethacrylate (2) and the monomethacrylate. Such additional monomers are not particularly limited as long as the monomers may be anionically polymerized. Examples include acrylate esters such as methyl acrylate, ethyl acrylate, n-propyl acrylate, isopropyl acrylate, n-butyl acrylate, t-butyl acrylate, 2-ethylhexyl acrylate, lauryl acrylate, dodecyl acrylate, cyclohexyl acrylate, isobornylacrylate, trimethoxysilylpropylacrylate, N,N-dimethylaminoethyl acrylate, N,N-diethylaminoethyl acrylate, 2-methoxyethyl acrylate, phenyl acrylate, naphthyl acrylate, 2-(trimethylsilyloxy)ethyl acrylate and 3-(trimethylsilyloxy)propyl acrylate; α-alkoxyacrylate esters such as methyl α-methoxyacrylate and methyl α-ethoxyacrylate; crotonate esters such as methyl crotonate and ethyl crotonate; 3-alkoxyacrylate esters such as 3-methoxyacrylate esters; acrylamides such as N-isopropylacrylamide, N-t-butylacrylamide, N,N-dimethylacrylamide and N,N-diethylacrylamide; methacrylamides such as N-isopropylmethacrylamide, N-t-butylmethacrylamide, N,N-dimethylmethacrylamide and N,N-diethylmethacrylamide; methyl 2-phenylacrylate, ethyl 2-phenylacrylate, n-butyl 2-bromoacrylate, methyl 2-bromomethylacrylate, ethyl 2-bromomethylacrylate methyl vinyl ketone, ethyl vinyl ketone, methyl isopropenyl ketone and ethyl isopropenyl ketone. In the methacrylate esters used in the step (1), the content of the additional monomer is preferably not more than 10 mol %, and more preferably not more than 5 mol % from the viewpoints of the active energy ray curability and the hygrothermal degradation properties of the obtainable block copolymer (X). The additional monomers may be used singly, or two or more may be used in combination.

In order to allow the polymerization to proceed smoothly, it is preferable that the monomers used in the step (1) (namely, the dimethacrylate (2) and the optional monomethacrylate and additional monomer) be dried beforehand in an inert gas atmosphere. In the drying treatment, dehydrating agents or desiccants such as calcium hydride, molecular sieves and active alumina are preferably used.

The organolithium compound used in the step (1) serves as an anionic polymerization initiator. Examples of the organolithium compounds include C3 to C30 organolithium compounds having a chemical structure in which the anionic center is a carbon atom, with specific examples including t-butyllithium, 2,2-dimethylpropyllithium, 1,1-diphenylhexyllithium, 1,1-diphenyl-3-methylpentyllithium, ethyl α-lithioisobutyrate, butyl α-lithioisobutyrate, methyl α-lithioisobutyrate, isopropyllithium, sec-butyllithium, 1-methylbutyllithium, 2-ethylpropyllithium, 1-methylpentyllithium, cyclohexyllithium, diphenylmethyllithium, α-methylbenzyllithium, methyllithium, n-propyllithium, n-butyllithium, n-pentyllithium and n-hexyllithium. From the viewpoints of availability and anionic polymerization initiation performance, C4 to C15 organolithium compounds having a chemical structure in which the anionic center is a secondary carbon atom are preferable, with specific examples including isopropyllithium, sec-butyllithium, 1-methylbutyllithium, 1-methylpentyllithium, cyclohexyllithium, diphenylmethyllithium and α-methylbenzyllithium. Sec-butyllithium is particularly preferred. The organolithium compounds may be used singly, or two or more may be used in combination.

In order to ensure that the block copolymer (X) will be produced smoothly, it is preferable that the organolithium compound be used in a molar amount that is 0.0001 to 0.3 times the total amount of the monomers in the mixture (namely, the dimethacrylate (2) and the optional monomethacrylate and additional monomer).

The tertiary organoaluminum compound used in the step (1) may be selected appropriately in accordance with conditions such as the types of the monomers used (namely, the dimethacrylate (2) and the optional monomethacrylate and additional monomer). From viewpoints such as polymerization rate, polymerization initiation efficiency and stability of polymer-end anions, it is preferable to use tertiary organoaluminum compounds represented by General Formula (3-1) below (hereinafter, such compounds are written as the aluminum compounds (3-1)):

$$AlR^4(R^5)(R^6) \qquad (3\text{-}1)$$

(wherein $R^4$ is a monovalent saturated hydrocarbon group, a monovalent aromatic hydrocarbon group, an alkoxy group, an aryloxy group or an N,N-disubstituted amino group, and $R^5$ and $R^6$ are each independently an aryloxy group or are bonded to each other to form an arylenedioxy group), or to use tertiary organoaluminum compounds represented by General Formula (3-2) below (hereinafter, such compounds are written as the aluminum compounds (3-2)):

$$AlR^7(R^8)(R^9) \qquad (3\text{-}2)$$

(wherein $R^7$ is an aryloxy group, and $R^8$ and $R^9$ are each independently a monovalent saturated hydrocarbon group, a monovalent aromatic hydrocarbon group, an alkoxy group or an N,N-disubstituted amino group). The use of the aluminum compounds (3-1) is more preferable.

Examples of the aryloxy groups represented by $R^4$, $R^5$, $R^6$ and $R^7$ include phenoxy group, 2-methylphenoxy group, 4-methylphenoxy group, 2,6-dimethylphenoxy group, 2,4-di-t-butylphenoxy group, 2,6-di-t-butylphenoxy group, 2,6-di-t-butyl-4-methylphenoxy group, 2,6-di-t-butyl-4-ethylphenoxy group, 2,6-diphenylphenoxy group, 1-naphthoxy group, 2-naphthoxy group, 9-phenanthryloxy group, 1-pyrenyloxy group and 7-methoxy-2-naphthoxy group.

Examples of the arylenedioxy groups represented by $R^5$ and $R^6$ in combination include groups resulting from the removal of the hydrogen atoms of the two phenolic hydroxyl groups in structures such as 2,2'-biphenol, 2,2'-methylenebisphenol, 2,2'-methylenebis(4-methyl-6-t-butylphenol), (R)-(+)-1,1'-bi-2-naphthol and (S)-(−)-1,1'-bi-2-naphthol.

The aryloxy groups and the arylenedioxy groups may have one or more substituents. Examples of the substituents include alkoxy groups such as methoxy group, ethoxy group, isopropoxy group and t-butoxy group; and halogen atoms such as chlorine and bromine.

Examples of the monovalent saturated hydrocarbon groups represented by $R^4$, $R^8$ and $R^9$ include alkyl groups such as methyl group, ethyl group, n-propyl group, isopropyl group, n-butyl group, isobutyl group, sec-butyl group, t-butyl group, 2-methylbutyl group, 3-methylbutyl group, n-octyl group and 2-ethylhexyl group; and cycloalkyl groups such as cyclohexyl group. Examples of the aromatic hydrocarbon groups represented by $R^4$, $R^8$ and $R^9$ include aryl groups such as phenyl group; and aralkyl groups such as benzyl group. Examples of the alkoxy groups represented by $R^4$, $R^8$ and $R^9$ include methoxy group, ethoxy group, isopropoxy group and t-butoxy group. Examples of the N,N-disubstituted amino groups represented by $R^4$, $R^8$ and $R^9$ include dialkylamino groups such as dimethylamino group, diethylamino group and diisopropylamino group; and bis(trimethylsilyl)amino group. The above functional groups represented by $R^4$, $R^8$ and $R^9$ may further have substituents, for example, alkoxy groups such as methoxy group, ethoxy group, isopropoxy group and t-butoxy group; and halogen atoms such as chlorine and bromine.

Examples of the aluminum compounds (3-1) include methylbis(2,6-di-t-butyl-4-methylphenoxy)aluminum, ethylbis(2,6-di-t-butyl-4-methylphenoxy)aluminum, ethylbis(2,6-di-t-butylphenoxy)aluminum, ethyl[2,2'-methylenebis(4-methyl-6-t-butylphenoxy)]aluminum, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octyl[2,2'-methylenebis(4-methyl-6-t-butylphenoxy)]aluminum, methoxybis(2,6-di-t-butyl-4-methylphenoxy)aluminum, methoxybis(2,6-di-t-butylphenoxy)aluminum, methoxy[2,2'-methylenebis(4-methyl-6-t-butylphenoxy)]aluminum, ethoxybis(2,6-di-t-butyl-4-methylphenoxy)aluminum, ethoxybis(2,6-di-t-butylphenoxy)aluminum, ethoxy[2,2'-methylenebis(4-methyl-6-t-butylphenoxy)]aluminum, isopropoxybis(2,6-di-t-butyl-4-methylphenoxy)aluminum, isopropoxybis(2,6-di-t-butylphenoxy)aluminum, isopropoxy[2,2'-methylenebis(4-methyl-6-t-butylphenoxy)]aluminum, t-butoxybis(2,6-di-t-butyl-4-methylphenoxy)aluminum, t-butoxybis(2,6-di-t-butylphenoxy)aluminum, t-butoxy[2,2'-methylenebis(4-methyl-6-t-butylphenoxy)]aluminum, tris(2,6-di-t-butyl-4-methylphenoxy)aluminum and tris(2,6-diphenylphenoxy)aluminum. Of these, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum and the like are preferable from viewpoints such as polymerization initiation efficiency, stability of polymer-end anions, availability and easy handling.

Examples of the aluminum compounds (3-2) include diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy)aluminum and di-n-octyl(2,6-di-t-butylphenoxy)aluminum. The tertiary organoaluminum compounds may be used singly, or two or more may be used in combination.

The tertiary organoaluminum compound may be used in a suitable amount selected appropriately in accordance with conditions such as the types of solvents and other various polymerization conditions. From the viewpoint of polymerization rate, it is preferable that the amount be in the range of 1.0 to 10.0 mol, more preferably in the range of 1.1 to 5.0 mol, and still more preferably in the range of 1.2 to 4.0 mol per 1 mol of the organolithium compound. Economic disadvantages tend to be caused if the amount of the tertiary organoaluminum compound exceeds 10.0 mol, and the anionic polymerization initiation efficiency tends to be decreased if the amount is less than 1.0 mol, per 1 mol of the organolithium compound.

The Lewis base used in the step (1) is selected from the group consisting of ethers and tertiary polyamines. The ethers may be appropriately selected from compounds having an ether bond in the molecule. From the viewpoints of polymerization initiation efficiency and stability of polymer-end anions, preferred ethers are cyclic ethers having two or more ether bonds in the molecule, and acyclic ethers having one or more ether bonds in the molecule. Examples of the cyclic ethers having two or more ether bonds in the molecule include crown ethers such as 12-crown-4, 15-crown-5 and 18-crown-6. Examples of the acyclic ethers having one or more ether bonds in the molecule include acyclic monoethers such as dimethyl ether, diethyl ether, diisopropyl ether, dibutyl ether and anisole; acyclic diethers such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane, 1,4-dibutoxybutane and 1,4-diphenoxybutane; and acyclic polyethers such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether and tetrabutylene glycol diethyl ether. From viewpoints such as suppression of side reactions and availability, acyclic ethers having one or two ether bonds in the molecule are preferable, and diethyl ether and 1,2-dimethoxyethane are more preferable.

In the invention, the tertiary polyamines which may be used as the Lewis bases are compounds having two or more tertiary amine structures in the molecule. Examples of the tertiary polyamines include chain polyamines such as N,N, N',N'-tetramethylethylenediamine, N,N,N',N'-tetraethylethylenediamine, N,N,N',N",N"-pentamethyldiethylenetriamine, 1,1,4,7,10,10-hexamethyltriethylenetetramine and tris[2-(dimethylamino)ethyl]amine; nonaromatic heterocyclic compounds such as 1,3,5-trimethylhexahydro-1,3,5-triazine, 1,4,7-trimethyl-1,4,7-triazacyclononane and 1,4,7,10,13,16-hexamethyl-1,4,7,10,13,16-hexaazacyclooctadecane; and aromatic heterocyclic compounds such as 2,2'-bipyridyl and 2,2':6',2"-terpyridine.

As the Lewis bases, use may be made of compounds having one or more ether bonds and one or more tertiary amine structures in the molecule. Examples of such compounds include tris[2-(2-methoxyethoxyl)ethyl]amine. The Lewis bases may be used singly, or two or more may be used in combination.

From viewpoints such as polymerization initiation efficiency and stability of polymer-end anions, the amount of the Lewis base used is preferably in the range of 0.3 to 5.0 mol, more preferably in the range of 0.5 to 3.0 mol, and still more preferably in the range of 1.0 to 2.0 mol per 1 mol of the organolithium compound. Economic disadvantages tend to be caused if the amount of the Lewis base exceeds 5.0 mol, and the anionic polymerization initiation efficiency tends to be decreased if the amount is less than 0.3 mol, per 1 mol of the organolithium compound.

The amount of the Lewis base is preferably in the range of 0.2 to 1.2 mol, and more preferably in the range of 0.3 to 1.0 mol per 1 mol of the tertiary organoaluminum compound.

In order to control the anionic polymerization temperature and to render the system uniform and thereby to allow the anionic polymerization to proceed smoothly, the step (1) is preferably carried out in the presence of an organic solvent. From viewpoints such as safety, separation from water used in the washing of the reaction mixture liquid after the anionic polymerization, and easiness in recovery and reuse, preferred examples of the organic solvents include hydrocarbons such as toluene, xylene, cyclohexane and methylcyclohexane; and halogenated hydrocarbons such as chloroform, methylene chloride and carbon tetrachloride. The organic solvents may be used singly, or two or more may be used in combination. To allow the anionic polymerization to proceed smoothly, it is preferable that the organic solvent be dried and deaerated in an inert gas before use.

The organic solvent may be used in an appropriate amount in accordance with the types of the monomers used (namely, the dimethacrylate (2) and the optional monomethacrylate and additional monomer) and the types of components such as the organolithium compound, the tertiary organoaluminum compound, the Lewis base and the organic solvent. From viewpoints such as smooth anionic polymerization, recovery of the resultant block copolymer (X) and waste liquid disposal, the amount of the solvent is preferably in the range of 150 to 10000 parts by mass, and more preferably in the range of 200 to 3000 parts by mass per 100 parts by mass of the monomers used.

In the step (1), the anionic polymerization is preferably performed at −100 to 50° C. From the viewpoints of polymerization control and productivity, the polymerization temperature is particularly preferably −30 to 25° C. At below −100° C., the polymerization is slow and tends to cause a decrease in productivity. If, on the other hand, the temperature is above 50° C., it is difficult to suppress the polymerization of the dimethacrylate (2) via the methacryloyl group that is bonded to the carbon atom to which $R^2$ and $R^3$ are bonded. Consequently, the obtainable block copolymer (X) tends to exhibit low active energy ray curability and low hygrothermal degradation properties.

The anionic polymerization is preferably performed in an inert gas atmosphere such as nitrogen, argon or helium. Further, the anionic polymerization is preferably carried out while performing sufficient stirring so that the reaction system will be uniform.

In the step (1), the organolithium compound, the tertiary organoaluminum compound, the Lewis base and the methacrylate ester may be added to the anionic polymerization reaction system by any method without limitation. It is, however, preferable that the Lewis base be added in such a manner that it is brought into contact with the tertiary organoaluminum compound before contact with the organolithium compound. The tertiary organoaluminum compound may be added to the anionic polymerization reaction system before or at the same time as the methacrylate ester. When the tertiary organoaluminum compound is added to the anionic polymerization reaction system simultaneously with the methacrylate ester, the addition may take place after the tertiary organoaluminum compound is mixed together with the methacrylate ester separately. Where necessary, additives may be added to the anionic polymerization reaction system. Examples of such additives include inorganic salts such as lithium chloride; metal alkoxides such as lithium methoxyethoxyethoxide and potassium t-butoxide; tetraethylammonium chloride and tetraethylphosphonium bromide.

The process for producing the block copolymer (X) according to the invention further includes a step (2) of adding and anionically polymerizing a mono(meth)acrylate after the step (1).

Examples of the mono (meth)acrylates used in the step (2) include monoacrylates such as methyl acrylate, ethyl acrylate, n-propyl acrylate, isopropyl acrylate, n-butyl acrylate, t-butyl acrylate, cyclohexyl acrylate, 2-ethylhexyl acrylate, isobornyl acrylate, lauryl acrylate, dodecyl acrylate, trimethoxysilylpropyl acrylate, N,N-dimethylaminoethyl acrylate, N,N-diethylaminoethyl acrylate, 2-methoxyethyl acrylate, phenyl acrylate, naphthyl acrylate, 2-(trimethylsilyloxy)ethyl acrylate and 3-(trimethylsilyloxy)propyl acrylate; and monomethacrylates such as methyl methacrylate, ethyl methacrylate, n-propyl methacrylate, isopropyl methacrylate, n-butyl methacrylate, t-butyl methacrylate, cyclohexyl methacrylate, 2-ethylhexyl methacrylate, isobornyl methacrylate, lauryl methacrylate, dodecyl methacrylate, trimethoxysilylpropyl methacrylate, N,N-dimethylaminoethyl methacrylate, N,N-diethylaminoethyl methacrylate, 2-methoxyethyl methacrylate, phenyl methacrylate, naphthyl methacrylate, 2-(trimethylsilyloxy)ethyl methacrylate and 3-(trimethylsilyloxy)propyl methacrylate. Those alkyl monoacrylates in which the alkyl group has 4 or more carbon atoms are preferable, with examples including n-butyl acrylate, t-butyl acrylate, 2-ethylhexyl acrylate, lauryl acrylate and dodecyl acrylate, and those alkyl monomethacrylates in which the alkyl group has 6 or more carbon atoms are preferable, with examples including 2-ethylhexyl methacrylate, lauryl methacrylate and dodecyl methacrylate. The mono(meth)acrylates may be used singly, or two or more may be used in combination.

A monomer other than the mono(meth)acrylate may be additionally used while ensuring that such use does not inhibit the anionic polymerization in the step (2). Such additional monomers are not particularly limited as long as the monomers may be anionically polymerized. Examples include α-alkoxyacrylate esters such as methyl α-methoxyacrylate and methyl α-ethoxyacrylate; crotonate esters such as methyl crotonate and ethyl crotonate; 3-alkoxyacrylate esters such as 3-methoxyacrylate esters; acrylamide compounds such as N-isopropylacrylamide, N-t-butylacrylamide, N,N-dimethylacrylamide and N,N-diethylacrylamide; methacrylamide compounds such as N-isopropylmethacrylamide, N-t-butylmethacrylamide, N,N-dimethylmethacrylamide and N,N-diethylmethacrylamide; methyl vinyl ketone, ethyl vinyl ketone, methyl isopropenyl ketone and ethyl isopropenyl ketone. The amount of the additional monomer used is not particularly limited, but is preferably not more than 10 mol %, and more preferably not more than 5 mol % relative to all the monomers used in the step (2). The additional monomers may be used singly, or two or more may be used in combination.

In order to allow the polymerization to proceed smoothly, it is preferable that the monomers used in the step (2) (namely, the mono(meth)acrylate and the optional additional monomer) be dried beforehand in an inert gas atmosphere. In the drying treatment, dehydrating agents or desiccants such as calcium hydride, molecular sieves and active alumina are preferably used.

In addition to the monomers used in the step (2) (namely, the mono(meth)acrylate and the optional additional monomer), a tertiary organoaluminum compound, a Lewis base and an organic solvent may be added to the anionic polymerization reaction system. Examples of the tertiary organoaluminum compounds, the Lewis bases and the organic solvents include the tertiary organoaluminum compounds, the Lewis bases and the organic solvents mentioned hereinabove for use in the step (1). The tertiary organoaluminum compound, the Lewis base and the organic solvent may be used in suitable amounts selected appropriately in accordance with conditions such as the types of solvents and other various polymerization conditions.

In the step (2), the monomers (namely, the mono(meth) acrylate and the optional additional monomer), the tertiary organoaluminum compound, the Lewis base and the organic solvent which may be used in the step (2) may be added to the anionic polymerization reaction system by any method without limitation. Where necessary, additives may be added to the anionic polymerization reaction system. Examples of such additives include inorganic salts such as lithium chloride; metal alkoxides such as lithium methoxyethoxyethoxide and potassium t-butoxide; tetraethylammonium chloride and tetraethylphosphonium bromide.

In the step (2), the anionic polymerization is preferably performed at −100 to 50° C. From the viewpoints of polymerization control and productivity, the polymerization temperature is particularly preferably −30 to 25° C.

From the viewpoint of the enhancement of the stability of polymer-end anions, it is preferable that the step (2) include:
a step (2-1) of adding and anionically polymerizing a monomethacrylate after the step (1); and
a step (2-2) of adding and anionically polymerizing a monoacrylate after the step (2-1).

The monomethacrylate used in the step (2-1) may be any of the monomethacrylates mentioned hereinabove. In the step (2-1), one, or two or more kinds of the monomethacrylates may be used.

The monoacrylate used in the step (2-2) may be any of the monoacrylates mentioned hereinabove. In the step (2-2), one, or two or more kinds of the monoacrylates may be used.

The process for producing the block copolymer (X) according to the invention may further include a step (3) of adding and anionically polymerizing a methacrylate ester including a dimethacrylate (2) after the step (2) or the step (2-2).

The step (3) may involve a single kind of the dimethacrylate (2) or a combination of two or more kinds of the dimethacrylates (2). The dimethacrylate (2) which may be used in the step (3) may be the same as or different from that used in the step (1).

The methacrylate esters used in the step (3) may include a monomethacrylate in addition to the dimethacrylate (2). Examples of the monomethacrylates include the monomethacrylates mentioned hereinabove for use in the step (1). The step (3) may involve one, or two or more kinds of the monomethacrylates. The monomethacrylate used may be the same as or different from the monomethacrylate used in the step (1) or the step (2).

In the methacrylate esters used in the step (3), the molar ratio of the dimethacrylate (2) to the monomethacrylate is preferably in the range of 5:95 to 100:0, more preferably in the range of 10:90 to 80:20, and still more preferably in the range of 20:80 to 70:30.

The methacrylate esters used in the step (3) may further include a monomer other than the dimethacrylate (2) and the monomethacrylate. Examples of such additional monomers include those mentioned in the step (1). In the methacrylate esters used in the step (3), the content of the additional monomer is preferably not more than 10 mol %, and more preferably not more than 5 mol % from the viewpoints of the active energy ray curability and the hygrothermal degradation properties of the obtainable block copolymer (X).

In order to allow the polymerization to proceed smoothly, it is preferable that the dimethacrylate (2) and the optional monomethacrylate and additional monomer used in the step (3) be dried beforehand in an inert gas atmosphere.

In the step (3), a tertiary organoaluminum compound, a Lewis base and an organic solvent may be added to the anionic polymerization reaction system. Examples of the tertiary organoaluminum compounds, the Lewis bases and the organic solvents include the tertiary organoaluminum compounds, the Lewis bases and the organic solvents mentioned hereinabove for use in the step (1). The tertiary organoaluminum compound, the Lewis base and the organic solvent may be used in suitable amounts selected appropriately in accordance with conditions such as the types of solvents and other various polymerization conditions.

In the step (3), the monomers (namely, the dimethacrylate (2) and the optional monomethacrylate and additional monomer), the tertiary organoaluminum compound, the Lewis base and the organic solvent which may be used in the step (3) may be added to the anionic polymerization reaction system by any method without limitation. Where necessary, additives may be added to the anionic polymerization reaction system. Examples of such additives include inorganic salts such as lithium chloride; metal alkoxides such as lithium methoxyethoxyethoxide and potassium t-butoxide; tetraethylammonium chloride and tetraethylphosphonium bromide.

In the step (3), the anionic polymerization is preferably performed at −100 to 50° C. From the viewpoints of polymerization control and productivity, the polymerization temperature is particularly preferably −30 to 25° C.

In the production of the block copolymer (X), the anionic polymerization may be terminated by adding a polymerization terminator to the reaction mixture. Examples of such terminators include protic compounds, specifically, methanol; methanol solutions of acetic acid or hydrochloric acid; and aqueous solutions of acetic acid or hydrochloric acid. The amount of the polymerization terminator is preferably in the range of 1 to 100 mol per 1 mol of the organolithium compound used.

After the termination of the anionic polymerization, the block copolymer (X) may be separated and recovered from the reaction mixture liquid by a known method. For example, the reaction mixture liquid may be poured into a poor solvent for the block copolymer (X) to precipitate the block copolymer (X). Alternatively, the block copolymer (X) may be recovered by subjecting the reaction mixture liquid to distillation to evaporate the organic solvent.

In the case where the block copolymer (X) that has been separated contains residual metal components derived from the organolithium compound and the tertiary organoaluminum compound, the presence of such components may cause a decrease in the properties or the transparency of the block copolymer (X). It is therefore preferable that the metal components derived from the organolithium compound and the tertiary organoaluminum compound be removed after the termination of the anionic polymerization. Such metal components may be effectively removed by subjecting the block copolymer (X) to a washing treatment with an acidic aqueous solution, or an adsorption treatment using an adsorbent such as an ion exchange resin, Celite or active carbon. Examples of the acidic aqueous solutions include hydrochloric acid, aqueous sulfuric acid solution, aqueous nitric acid solution, aqueous acetic acid solution, aqueous propionic acid solution and aqueous citric acid solution.

According to the production process of the invention, block copolymers (X) having a narrow molecular weight distribution may be usually obtained, specifically, block copolymers (X) having a molecular weight distribution (Mw/Mn) of 1.5 or less may be produced.

The block copolymer (X) of the invention may be blended with agents such as a photopolymerization initiator, a compound that exhibits polymerizability upon irradiation with active energy rays wherein the compound (hereinafter, written as the reactive diluent) is not the block copolymer (X), and an organic compound that is stable to active energy rays (hereinafter, written as the inert diluent), the blend resulting in an active energy ray curable composition according to the present invention.

Examples of the photopolymerization initiators include carbonyl compounds such as acetophenones (for example, 1-hydroxycyclohexyl phenyl ketone, 2,2-dimethoxy-1,2-diphenylethan-1-one and 2-hydroxy-2-methyl-1-phenyl-propan-1-one), benzophenones (for example, benzophenone, benzoylbenzoic acid, hydroxybenzophenone, 3,3'-dimethyl-4-methoxybenzophenone and acrylated benzophenone), Michler's ketones (for example, Michler's ketone) and benzoins (for example, benzoin, benzoin methyl ether and benzoin isopropyl ether), sulfur compounds such as tetramethylthiuram monosulfide and thioxanthones (for example, thioxanthone and 2-chlorothioxanthone), and azo compounds (for example, azobisisobutyronitrile). The photopolymerization initiators may be used singly, or two or more may be used in combination. Of these, acetophenones and benzophenones are preferred.

Sensitizers may be used as required. Examples of the sensitizers include n-butylamine, di-n-butylamine, tri-n-butylphosphine, allylthiouric acid, triethylamine and diethylaminoethyl methacrylate, with triethylamine and diethylaminoethyl methacrylate being preferred.

In the mixture of the photopolymerization initiator and the sensitizer, the mass ratio of the photopolymerization initiator to the sensitizer is preferably 10:90 to 90:10, and more preferably 20:80 to 80:20.

The amount of the photopolymerization initiator is preferably 0.01 to 10 parts by mass, and more preferably 0.05 to 8 parts by mass with respect to 100 parts by mass of the block copolymer (X). If the amount is less than 0.01 part by mass, the obtainable active energy ray curable composition tends to exhibit insufficient curability. If the amount exceeds 10 parts by mass, the active energy ray curable composition shows so high a curing rate that the obtainable cured product only attains a low molecular weight and tends to exhibit poor heat resistance.

Examples of the reactive diluents include compounds which may be cured by the irradiation with active energy rays. Specific examples include styrene derivatives such as styrene, indene, p-methylstyrene, α-methylstyrene, p-methoxystyrene, p-tert-butoxystyrene, p-chloromethylstyrene, p-acetoxystyrene and divinylbenzene; fatty acid vinyl esters such as vinyl acetate, vinyl propionate, vinyl butyrate, vinyl caproate, vinyl benzoate and vinyl cinnamate; (meth)acrylic acid derivatives such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, isobornyl (meth)acrylate, bornyl (meth)acrylate, tricyclodecanyl (meth)acrylate, dicyclopentanyl (meth)acrylate, dicyclopentenyloxyethyl (meth)acrylate, 4-butylcyclohexyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol monoester (meth)acrylate, polypropylene glycol monoester (meth)acrylate, methoxyethylene glycol (meth)acrylate, ethoxyethyl (meth)acrylate, methoxypolyethylene glycol (meth)acrylate, methoxypolypropylene glycol (meth)acrylate, dimethylaminoethyl (meth)acrylate, diethylaminoethyl (meth)acrylate, 7-amino-3,7-dimethyloctyl (meth)acrylate, 4-acryloylmorpholine; trimethylolpropane tri(meth)acrylate, trimethylolpropanetrioxyethyl (meth)acrylate, pentaerythritol tri(meth)acrylate, ethylene glycol di(meth)acrylate, triethylene glycol diacrylate, tetraethylene glycol di(meth)acrylate, tricyclodecanediyldimethanol di(meth)acrylate, polyethylene glycol di(meth)acrylate, 1,4-butanediol di(meth)acrylate, 1,6-hexanediol di(meth)acrylate, neopentyl glycol di(meth)acrylate, tripropylene glycol di(meth)acrylate, neopentyl glycol di(meth)acrylate, adduct of bisphenol A diglycidyl ether with (meth)acrylic acid at both ends, pentaerythritol tri(meth)acrylate, pentaerythritol tetra(meth)acrylate, polyester di(meth)acrylate, tris(2-hydroxyethyl)isocyanurate tri(meth)acrylate, tris (2-hydroxyethyl)isocyanurate di(meth)acrylate, tricyclodecanedimethanol di(meth)acrylate, di(meth)acrylates of diols that are adducts of bisphenol A with ethylene oxide or propylene oxide, di(meth)acrylates of diols that are adducts of hydrogenated bisphenol A with ethylene oxide or propylene oxide, epoxy (meth)acrylate resulting from the addition of (meth)acrylate to diglycidyl ether of bisphenol A, tricyclodecanedimethanol di(meth)acrylate and cyclohexanedimethanol di(meth)acrylate; epoxy acrylate resins such as bisphenol A epoxy acrylate resins, phenol novolac epoxy acrylate resins and cresol novolac epoxy acrylate resins, COOH group-modified epoxy acrylate resins, urethane acrylate resins obtained by reacting urethane resins with hydroxyl group-containing (meth)acrylates (such as hydroxyethyl (meth)acrylate, hydroxypropyl (meth)acrylate, hydroxybutyl (meth)acrylate and pentaerythritol triacrylate) wherein the urethane resins are resins obtained from polyols (such as polytetramethylene glycol, polyester diol of ethylene glycol with adipic acid, ε-caprolactone-modified polyester diol, polypropylene glycol, polyethylene glycol, polycarbonate diol, hydroxyl-terminated hydrogenated polyisoprene, hydroxyl-terminated polybutadiene and hydroxyl-terminated polyisobutylene) with organic isocyanates (such as tolylene diisocyanate, isophorone diisocyanate, diphenylmethane diisocyanate, hexamethylene diisocyanate and xylylene diisocyanate), resins obtained by introducing (meth)acrylic groups to the above polyols via ester bonds, and polyester acrylate resins. The reactive diluents may be used singly, or two or more may be used in combination.

From the viewpoints of the viscosity of the obtainable active energy ray curable composition and the mechanical characteristics of cured products, the mass ratio of the block copolymer (X) to the reactive diluent is preferably in the range of 10:90 to 90:10, and more preferably in the range of 20:80 to 80:20.

The inert diluents may be added for purposes such as to control the viscosity of the active energy ray curable composition and to control the mechanical strength of cured products obtained by curing the active energy ray curable composition. Examples of the inert diluents suited for such purposes include compounds having no active energy ray curable groups. Specific examples include phthalate esters such as dibutyl phthalate, diheptyl phthalate, di(2-ethylhexyl) phthalate and butylbenzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; polyalkylene glycol esters such as diethylene glycol dibenzoate, triethylene glycol dibenzoate and pentaerythritol ester; phosphate esters such as tricresyl phosphate and tributyl phosphate; trimellitate esters; polystyrenes such as polystyrene and poly-α-methylstyrene; polybutadiene; polybutene; polyisobutylene; butadiene-acrylonitrile copolymer; polychloroprene; chlorinated paraffins; hydrocarbon oils such as alkyldiphenyl and partially hydrogenated terphenyl; process oils; polyethers such as polyether polyols including polyethylene glycol, polypropylene glycol and polytetramethylene glycol as well as derivatives obtained by converting the hydroxyl groups of these polyether polyols to groups such as ester groups and ether groups; polyester plasticizers obtained from dibasic acids such as sebacic acid, adipic acid, azelaic acid and phthalic acid, and dihydroxy alcohols such as ethylene glycol, diethylene glycol, triethylene glycol, propylene glycol and dipropylene glycol; and vinyl polymers obtained by polymerizing vinyl monomers by various methods (such as acrylic polymers, styrene polymers, diene polymers, vinyl ether polymers and copolymers of these polymers). The inert diluents may be used singly, or two or more may be used in combination.

The amount of the inert diluent is preferably 5 to 150 parts by mass, more preferably 10 to 120 parts by mass, and still more preferably 20 to 100 parts by mass with respect to 100 parts by mass of the block copolymer (X). The inert diluents added in amounts of 5 parts by mass or more tend to provide marked effects in, for example, property adjustment and quality control. The inert diluents added in amounts of 150 parts by mass or less tend to ensure that the active energy ray curable composition gives cured products having excellent mechanical strength.

In particular, the inert diluents are preferably polymers (hereinafter, written as the inert polymers) having a number average molecular weight of 400 to 15,000 (preferably 800 to 10,000, and more preferably 1,000 to 8,000). The inert polymers may have or may be free from functional groups other than active energy ray curable groups (for example, hydroxyl groups, carboxyl groups and halogen groups).

By virtue of the inert polymer having a molecular weight of 400 or more, cured products of the active energy ray curable composition can maintain initial properties over a long term without the bleeding out of the inert polymer over time. When the molecular weight of the inert polymer is 15,000 or less, the active energy ray curable composition tends to exhibit good handling properties.

The molecular weight distribution of the inert polymer is not particularly limited, but is usually less than 1.8, preferably 1.7 or less, more preferably 1.6 or less, still more preferably 1.5 or less, particularly preferably 1.4 or less, and most preferably 1.3 or less.

Of the inert polymers, those which are compatible with the block copolymer (X) are preferable. From the viewpoints of compatibility, weather resistance and heat resistance, in particular, vinyl polymers are more preferable, (meth)acrylic polymers are still more preferable, and acrylic polymers are particularly preferable. Examples of such acrylic polymers include poly(n-butyl acrylate) and poly(2-ethylhexyl acrylate). For example, the acrylic polymers may be synthesized by conventional solution polymerization. Alternatively, solvent-free acrylic polymers are also usable. The latter acrylic plasticizers are more suited for achieving the objects of the invention because of the fact that they are produced without the use of solvents or chain transfer agents by high-temperature continuous polymerization methods (U.S. Pat. No. 4,414,370, JP-A-S59-6207, JP-B-H05-58005, JP-A-H01-313522 and U.S. Pat. No. 5,010,166). Examples of such polymers include, but are not particularly limited to, UP series manufactured by TOAGOSEI CO., LTD. (see Kougyou Zairyou (Industrial Materials), October issue, 1999). Examples of other synthesis methods include a living radical polymerization method. This method is preferable in that the obtainable polymers have a narrow molecular weight distribution and exhibit low viscosity. An atom transfer radical polymerization method is more preferable, although the synthesis method is not limited thereto.

Another purpose of adding the inert diluents is to impart tackiness to cured products of the active energy ray curable composition. Examples of the inert diluents suited for the purpose include chroman-indene resins, phenolic resins, p-t-butylphenol-acetylene resins, phenol-formaldehyde resins, polyterpene resins, xylene-formaldehyde resins, synthetic polyterpene resins, aromatic hydrocarbon resins, aliphatic cyclic hydrocarbon resins, oligomers of monoolefins or diolefins, hydrocarbon resins, hydrogenated hydrocarbon resins, polybutenes, rosin polyhydric alcohol esters, hydrogenated rosins, hydrogenated wood rosins, esters of hydrogenated rosins with monoalcohols or polyhydric alcohols, and turpentine tackifier resins. Particularly preferred examples of the tackifier resins include terpene resins, synthetic terpene resins, aromatic modified polyterpene resins, aliphatic saturated petroleum resins, rosin esters, disproportionated rosin esters, hydrogenated rosin esters, aliphatic petroleum resins (such as C5 aliphatic petroleum resins and C5-C9 aliphatic petroleum resins) and modified aliphatic petroleum resins.

The active energy ray curable composition of the invention may contain any of various known additives as optional components while still ensuring that the curability thereof is not markedly decreased, with examples including softeners, fillers, stabilizers, pigments and dyes. The additives may be organic compounds (inert diluents) or inorganic compounds.

Examples of the active energy rays used to cure the active energy ray curable compositions of the invention include radiations such as far-ultraviolet rays, ultraviolet rays, near-ultraviolet rays and infrared rays, electromagnetic waves such as X-rays and γ-rays, electron beams, proton beams and neutron beams. From viewpoints such as curing rate, availability of irradiation devices and cost, the curing is preferably performed by the application of ultraviolet rays or electron beams, and more preferably performed by the application of ultraviolet rays.

The active energy rays may be applied with known devices. In the case of electron beams (EB), the accelerating voltage is appropriately in the range of 0.1 to 10 MeV and the dose in the range of 1 to 500 kGy.

For the application of ultraviolet rays, light sources emitting light in the wavelength range of 150 to 450 nm may be used, with examples including high-pressure mercury lamps, ultrahigh-pressure mercury lamps, carbon arc lamps, metal halide lamps, xenon lamps, chemical lamps and LEDs. The integrated amount of light of the active energy rays is usually in the range of 10 to 20000 $mJ/cm^2$, and preferably in the range of 30 to 5000 $mJ/cm^2$. If the integrated amount of light is less than 10 $mJ/cm^2$, the active energy ray curable composition does not exhibit sufficient curability. Any irradiation with more than 20000 $mJ/cm^2$ may degrade the active energy ray curable composition.

During the irradiation of the active energy ray curable composition of the invention with the active energy rays, the relative humidity is preferably not more than 30%, and more preferably not more than 10% in order to prevent the active energy ray curable composition from being decomposed.

During or after the irradiation with the active energy rays, the active energy ray curable composition of the invention may be heated as required to promote the curing. The heating temperature is preferably in the range of 40 to 130° C., and more preferably in the range of 50 to 100° C.

After the application of the active energy ray curable compositions of the invention as adhesives, coating materials or the like onto substrates followed by curing of the compositions, the resultant cured products can be easily removed and separated from the substrates as required such as when the products are to be disposed of. From the viewpoints of workability and economic efficiency, a preferred removal method is a hygrothermal degradation method.

The temperature at which the hygrothermal degradation method is performed (the hygrothermal degradation temperature) is preferably 100 to 250° C., and more preferably 130 to 220° C.

The relative humidity at which the hygrothermal degradation method is performed (the hygrothermal degradation relative humidity) is preferably 10 to 100%, and more preferably 30 to 100%.

The time required for the hygrothermal degradation method (the hygrothermal degradation time) is preferably 1 minute to 24 hours, more preferably 1 minute to 5 hours, and still more preferably 1 minute to 2 hours.

The use applications of the active energy ray curable compositions of the present invention include curable resins, adhesives and pressure-sensitive adhesives, tapes, films, sheets, mats, sealing materials, sealants, coating materials, potting materials, inks, printing plate materials, vibration absorbing materials, foams, heat radiation materials, prepregs, gaskets and packings used in the fields of automobiles, home appliances, buildings, civil engineering, sports, displays, optical recording devices, optical devices, semiconductors, batteries and printing.

Specific examples include:

adhesives and pressure-sensitive adhesives (hot melt adhesives and photocurable adhesives) for polypropylenes, metals, timbers and the like;

sealing materials for hard disk drives (HDDs), buildings, automobiles, flexible printed electronics, electric and electronic components (such as solar cell backsides), and the like;

sealants for purposes such as antirust, moisture-proof and waterproof used for HDDs, buildings, automobiles, flexible printed electronics, electric and electronic components (such as solar cell backsides), and the like;

electrical insulating materials such as insulating covering materials for wires and cables;

coating materials such as metal deposition film undercoats, hard coats and optical fiber coats;

inks such as LED curable inks, UV curable inks, electron beam curable inks and inkjet inks;

airtight sealing materials such as gaskets, packings, vibration absorbing rubbers, fenders, glass vibration preventing materials, sealants for wire glass and laminated glass end faces (cut sections), window seal gaskets and door glass gaskets used for automobiles, railway vehicles, aircrafts and industrial facility or equipment;

marine vessel applications such as vibration damping materials for engine rooms and instrument rooms;

automobile applications such as engines (oil pans, front covers, rocker covers), bodies (dashes, floors, doors, roofs, panels, wheelhouses), transmissions, parking brake covers and vibration damping materials for seat backs;

chassis parts such as vibration absorbing and soundproof engine and suspension rubbers (in particular, engine mount rubbers);

engine parts such as hoses for purposes such as cooling, fuel supply and exhaust control, and engine oil sealing materials;

exhaust gas cleaning equipment parts;

brake parts;

home appliance parts such as packings, O-rings and belts (ornaments, waterproof packings, vibration absorbing rubbers and insect-proof packings for lighting apparatuses; vibration absorbing and sound absorbing materials and air sealing materials for cleaners; drip-proof covers, waterproof packings, heater packings, electrode packings and safety valve diaphragms for electric water heaters; hoses, waterproof packings and solenoid valves for sake warmers; waterproof packings, water supply tank packings, water suction valves, water tray packings, connection hoses, belts, warmer/heater packings, steam outlet seals and the like for steam ovens and jar rice cookers; oil packings, O-rings, drain packings, pressure tubes, air tubes, blowing or suction packings, vibration absorbing rubbers, oil supply port packings, oil meter packings, oil feed tubes, diaphragm valves, flues and the like for combustion engines; and speaker gaskets, speaker edges, turntable sheets, belts, pulleys and the like for audio equipment);

building applications such as structural gaskets (zipper gaskets), air-inflated membrane structure roofing materials, waterproof materials, shaped sealing materials, vibration absorbing materials, soundproof materials, setting blocks and sliding materials;

sports applications such as sporting floors (such as all-weather surface materials and gymnasium floors), athletic shoes members (such as shoe sole materials and insole materials), and balls for ball games (such as golf balls);

architecture applications such as roofs, floors, shutters, curtain rails, floorings, pipe ducts, deck plates, curtain walls, stairs, doors, vibration isolators and vibration damping materials for structural members;

civil engineering applications such as structural materials (such as rubber expansion joints, bearings, water stop plates, waterproof sheets, rubber dams, elastic pavements, vibration absorbing pads and protectors), construction secondary materials (such as rubber molds, rubber packers, rubber skirts, sponge mats, mortar hoses and mortar strainers), construction auxiliary materials (such as rubber sheets and air hoses), safety measure products (such as rubber buoys and wave-dissipating materials) and environmental protection products (such as oil fences, silt fences, antifouling materials, marine hoses, dredging hoses and oil skimmers);

sealants, optically clear resins (OCRs) and fillers for displays such as liquid crystal displays, color PDPs (plasma displays), plasma addressed liquid crystal (PALC) displays, organic EL (electroluminescence) displays, organic TFT (organic thin film transistor) displays, field emission displays (FEDs), electronic papers, touch panels, mobile phone displays and car navigation displays;

disk substrate materials, pickup lenses, protective films, sealants and adhesives for video disks (VDs), CDs, CD-ROMs, CD-Rs, CD-RWs, DVDs, DVD-ROMs, DVD-Rs, DVD-RWs, BDs, BD-ROMs, BD-Rs, BD-REs, MOs, MDs, phase change disks (PDs), holograms and optical cards;

lenses, finder prisms, optical fibers, target prisms, finder covers, light-receiving sensor units, protective films, ferrules, sealants and adhesives for optical devices (still cameras, video cameras, projectors and optical sensors);

solar cell parts such as component sealants, front glass protective films and adhesives;

electric and electronic equipment applications such as vibration damping materials for stepping motors, magnetic disks, hard disks, dishwashers, dryers, washing machines, fan heaters, sewing machines, vending machines, speaker frames, BS antennas and VTR covers;

camera and office equipment applications such as vibration damping materials for TV cameras, copiers, computers, printers, registers and cabinets;

substrate materials in optoelectronic integrated circuit (OEIC) peripheries;

heat spreaders;

thermal interfaces that transfer heat between heating elements and heat spreaders and between heat spreaders and cooling members;

hot parts such as electronic devices including heaters, temperature sensors, CPUs and transistors;

heat sinks such as heat dissipating fins, and cooling members such as graphite sheets (graphite films), liquid ceramics and Peltier devices;

thermal conductive materials;

semiconductor resists (UV resists, deep UV resists, EB resists, electrodeposition resists, dry film resists) for semiconductor circuits used in fields such as the home appliance and automobile electronic fields (such as circuit pattern formation, and heat-resistant covers during soldering of printed circuit boards);

liquid solder resists for printed wiring boards;

electrodeposition resists for printed circuit boards, build-up boards and three-dimensional circuit boards;

dry film resists for circuit formation on single-sided, double-sided, or multilayered boards;

photoresists for liquid crystals such as for TFT wirings and for color filters;

permanent resist applications such as insulation coatings; and other resist applications;

adhesives and pressure-sensitive adhesives for semiconductor dicing tapes and die-bonding tapes;

resist materials for the microlithography of LSI and ultra LSI materials;

LED sealants and die-bonding materials, and sealants for LED-mounted reflective and radiative substrates;

lighting apparatuses for decorative displays;

signs or indicators;

industrial machinery-related applications such as vibration damping materials for shooters, elevators, escalators, conveyors, tractors, bulldozers, power generators, compressors, containers, hoppers, soundproof boxes and mower motor covers;

railway applications such as vibration damping materials for railway vehicle roofs, side plates, doors, underfloor materials, various auxiliary covers and bridges;

vibration absorbing materials, vibration damping materials, soundproof materials and seismic isolation materials, for example semiconductor applications such as vibration damping materials for precision vibration isolating units;

foaming agents such as thermal insulation materials, cushioning materials, sound absorbing materials, vibration absorbing materials, artificial leathers, casting materials, molding materials and potting materials; and prepregs used in, for example, leisure applications such as golf shafts, fishing rods and boats, fiber reinforced plastic (FRP) applications, automobile, aircraft and space applications, interlayer insulation applications in rotating machines, transformers and controllers, and bonding of industrial products and electronic components.

EXAMPLES

The present invention will be described in detail by presenting Examples and Comparative Example hereinbelow without limiting the scope of the invention to such Examples.

In Examples and Comparative Example, raw materials that were used had been dried and purified by known methods and deaerated in nitrogen. They were transferred and fed in a nitrogen atmosphere.

[Monomer Consumption Rate]

0.5 ml of a polymerization reaction liquid was sampled and admixed with 0.5 ml of methanol. 0.1 ml of the mixture liquid was sampled and dissolved in 0.5 ml of deuterated chloroform. The solution was analyzed by $^1$H-NMR (ECX400 manufactured by JEOL Ltd., measurement temperature=25° C.). The results were analyzed to calculate the rates of the consumption of monomers after polymerization.

[Number Average Molecular Weight and Molecular Weight Distribution]

A polymer obtained was analyzed by GPC (gel permeation chromatography, HLC-8220GPC (manufactured by TOSOH CORPORATION), column: TSK-gel Super Multipore HZ-M (manufactured by TOSOH CORPORATION) (column diameter=4.6 mm, column length=15 cm), measurement conditions: flow rate=0.35 ml/min, temperature=40° C., eluent=tetrahydrofuran). The number average molecular weight (Mn) and the molecular weight distribution (Mw/Mn) were determined relative to polystyrene standards.

[Initiator Efficiency]

The initiator efficiency (F1) in the step (1) was calculated using the following equation wherein Mn (R1) was the number average molecular weight of a polymer actually obtained in the step (1) and Mn (I1) was the number average molecular weight of a polymer theoretically obtained in the step (1).

$$F1(\%)=100\times Mn(R1)/Mn(I1)$$

[Block Efficiency]

The block efficiency (F2) between the step (1) and the step (2) was calculated using the following equation wherein Mn (R2) was the number average molecular weight of a block copolymer (X) actually obtained in the step (2) and Mn (I2) was the number average molecular weight of a block copolymer (X) theoretically obtained in the step (1).

$$F2(\%)=10000\cdot\{Mn(R2)-Mn(R1)\}/[F1\cdot\{Mn(I2)-Mn(I1)\}]$$

Example 1

The inside of a 300 ml flask was dried and purged with nitrogen, and 100 ml of toluene was added to the flask. While stirring the solution in the flask, there were sequentially added 0.78 ml (2.86 mmol) of 1,1,4,7,10,10-hexamethyltriethylenetetramine as a Lewis base and 12.7 ml of a 0.450 mol/L toluene solution of isobutylbis(2,6-di-t-butyl-4-methylphenoxy) aluminum as a tertiary organoaluminum compound. The mixture was cooled to −20° C. Further, 2.00 ml of a 1.30 mol/L cyclohexane solution of sec-butyllithium as an organolithium compound was added, followed by the addition of 3.58 ml of a mixture at once which contained 2.47 ml (10.4 mmol) of 1,1-dimethylpropane-1,3-diol dimethacrylate as a dimethacrylate (2) and 1.11 ml (10.4 mmol) of methyl methacrylate as a monomethacrylate. Anionic polymerization was thus initiated. After the completion of the addition of the mixture, the polymerization reaction liquid turned from original yellow to colorless in 10 minutes. The liquid was stirred for another 10 minutes, and a portion of the reaction liquid obtained in the step (1) was sampled.

Subsequently, while stirring the reaction liquid of the step (1) at −20° C., 2.22 ml (20.8 mmol) of methyl methacrylate as a monomethacrylate was added at once after 20 minutes from the initiation of the polymerization in the step (1), and, after 100 minutes, 37.4 ml (260 mmol) of n-butyl acrylate as a monoacrylate was added at a rate of 1 ml/min. A portion of the reaction liquid of the step (2) was sampled immediately after the completion of the addition of n-butyl acrylate.

Subsequently, while stirring the reaction liquid obtained in the step (2), 10.0 ml of methanol was added at −20° C. to terminate the anionic polymerization. The resultant solution was poured into 1 L of methanol, and the block copolymer (X) obtained was recovered as a precipitate.

In the step (1), the rate of the consumption of 1,1-dimethylpropane-1,3-diol dimethacrylate and that of methyl methacrylate were 100%. The polymer obtained in the step (1) had Mn of 1,500 and Mw/Mn of 1.13. Further, the initiator efficiency (F1) in the step (1) was 91%.

In the step (2), the rate of the consumption of methyl methacrylate and that of n-butyl acrylate were 100%. The block copolymer (X) obtained had Mn of 24,700 and Mw/Mn of 1.21. Further, the block efficiency (F2) between the step (1) and the step (2) was 65%. The results are described in Table 1.

Example 2

The step (1) was performed in the same manner as in Example 1 to prepare a reaction liquid. Subsequently, 37.4 ml (260 mmol) of n-butyl acrylate as a monoacrylate was added to the reaction liquid at −20° C. and at a rate of 1 ml/min after 120 minutes from the polymerization initiation in the step (1). A portion of the reaction liquid of the step (2) was sampled immediately after the completion of the addition of n-butyl acrylate.

Subsequently, while stirring the reaction liquid obtained in the step (2), 10.0 ml of methanol was added at −20° C. to terminate the anionic polymerization. The resultant solution was poured into 1 L of methanol, and the block copolymer (X) obtained was recovered as a precipitate.

In the step (1), the rate of the consumption of 1,1-dimethylpropane-1,3-diol dimethacrylate and that of methyl methacrylate were 100%. The polymer obtained in the step (1) had Mn of 1,520 and Mw/Mn of 1.15. Further, the initiator efficiency (F1) in the step (1) was 90%.

In the step (2), the rate of the consumption of n-butyl acrylate was 100%. The block copolymer (X) obtained had Mn of 41,700 and Mw/Mn of 1.20. Further, the block efficiency (F2) between the step (1) and the step (2) was 34%. The results are described in Table 1.

Example 3

The polymerization was performed by the same procedures as in Example 1, except that the mixture added in the step (1) was changed to 3.72 ml of a mixture which contained 2.61 ml (10.4 mmol) of 1,1-dimethylbutane-1,4-diol dimethacrylate as a dimethacrylate (2) and 1.11 ml (10.4 mmol) of methyl methacrylate as a monomethacrylate.

In the step (1), the rate of the consumption of 1,1-dimethylbutane-1,4-dioldimethacrylate and that of methyl methacrylate were 100%. The polymer obtained in the step (1) had Mn of 1,420 and Mw/Mn of 1.14. Further, the initiator efficiency (F1) in the step (1) was 99%.

In the step (2), the rate of the consumption of methyl methacrylate and that of n-butyl acrylate were 100%. The block copolymer (X) obtained had Mn of 16,900 and Mw/Mn of 1.15. Further, the block efficiency (F2) between the step (1) and the step (2) was 85%. The results are described in Table 1.

Example 4

The polymerization was performed by the same procedures as in Example 2, except that the mixture added in the step (1) was changed to 3.72 ml of a mixture which contained 2.61 ml (10.4 mmol) of 1,1-dimethylbutane-1,4-diol dimethacrylate as a dimethacrylate (2) and 1.11 ml (10.4 mmol) of methyl methacrylate as a monomethacrylate.

In the step (1), the rate of the consumption of 1,1-dimethylbutane-1,4-diol dimethacrylate and that of methyl methacrylate were 100%. The polymer obtained in the step (1) had Mn of 1,580 and Mw/Mn of 1.16. Further, the initiator efficiency (F1) in the step (1) was 90%.

In the step (2), the rate of the consumption of n-butyl acrylate was 100%. The block copolymer (X) obtained had Mn of 29,200 and Mw/Mn of 1.27. Further, the block efficiency (F2) between the step (1) and the step (2) was 50%. The results are described in Table 1.

TABLE 1

| | Step (1) | Step (2) | | Block efficiency (F2) |
|---|---|---|---|---|
| Ex. 1 | Dimethacrylate (2) = DMA-G1 (10.4 mmol) | Monomethacrylate = MMA (10.4 mmol) | Step (2-1) Monomethacrylate = MMA (20.8 mmol) | Step (2-2) Monoacrylate = nBA (260 mmol) | 65% |
| Ex. 2 | | | Mono(meth)acrylate = nBA (260 mmol) | | 34% |
| Ex. 3 | Dimethacrylate (2) = DMA-G2 (10.4 mmol) | | Step (2-1) Monomethacrylate = MMA (20.8 mmol) | Step (2-2) Monoacrylate = nBA (260 mmol) | 85% |
| Ex. 4 | | | Mono(meth)acrylate = nBA (260 mmol) | | 50% |

The abbreviations in Table 1 indicate the following.
DMA-G1: 1,1-dimethylpropane-1,3-diol dimethacrylate
DMA-G2: 1,1-dimethylbutane-1,4-diol dimethacrylate
MMA: methyl methacrylate
nBA: n-butyl acrylate In Example 1 and Example 3, the process included the step (2-1) in which the monomethacrylate was added and anionically polymerized after the step (1); and the step (2-2) in which the monoacrylate was added and anionically polymerized after the step (2-1). These processes achieved a higher block efficiency (F2) between the step (1) and the step (2) as compared to Example 2 and Example 4 which did not included the step (2-1) and the step (2-2). This shows that the stability of polymer-end anions during the polymerization was enhanced.

From the above results, it has been demonstrated that the step (2) in the production process of the invention preferably includes the step (2-1) of adding and anionically polymerizing a monomethacrylate after the step (1); and the step (2-2) of adding and anionically polymerizing a monoacrylate after the step (2-1).

Example 5

A reaction liquid of the step (2) was obtained in the same manner as in Example 1. While the reaction liquid was continuously stirred, the addition of n-butyl acrylate in the step (2) was immediately followed by the addition of 3.58 ml of a mixture at once which contained 2.47 ml (10.4 mmol) of 1,1-dimethylpropane-1,3-diol dimethacrylate as a dimethacrylate (2) and 1.11 ml (10.4 mmol) of methyl methacrylate as a monomethacrylate at −20° C. Thereafter, the temperature was increased to 0° C. at a rate of 5° C./min. After 120 minutes after the addition of the mixture, a portion of the reaction liquid obtained in the step (3) was sampled.

Subsequently, while stirring the reaction liquid obtained in the step (3), 10.0 ml of methanol was added to terminate the anionic polymerization. The resultant solution was poured into 1 L of methanol, and the block copolymer (X) obtained was recovered as a precipitate.

In the step (3), the rate of the consumption of 1,1-dimethylpropane-1,3-diol dimethacrylate and that of methyl methacrylate were 100%. The block copolymer (X) obtained had Mn of 26,300 and Mw/Mn of 1.22.

The block copolymer (X) obtained was dissolved in dicyclopentenyloxyethylmethacrylate (FA-512M manufactured by Hitachi Chemical Co., Ltd.) as a reactive diluent (a photopolymerizable monomer) to give a 70 mass % solution. To the resultant solution was added 5 parts by mass of 1-hydroxycyclohexyl phenyl ketone as a photopolymerization initiator in the form of a solution. Thus, an active energy ray curable composition was obtained.

The active energy ray curable composition obtained was subjected to the following UV curability test, adhesive strength test and holding strength test. The test results are described in Table 2.

(UV Curability Test)

A 130 μm thick pressure-sensitive adhesive tape (ASF-110 manufactured by CHUKOH FLO) was attached to a release-treated side of a PET release film (K1504 manufactured by TOYOBO CO., LTD.) in such a manner that a space 24 mm in width and 300 mm in length was formed. The active energy ray curable composition was applied onto the space, and another sheet of the PET release film (K1504 manufactured by TOYOBO CO., LTD.) was placed thereon. The stack was rolled with a laminate roller to spread the active energy ray curable composition. Next, UV rays were applied onto the PET release film at 3000 mJ/cm$^2$ with use of UV irradiation device HTE-3000B INTEGRATOR 814M (manufactured by HI-TECH), thereby curing the active energy ray curable composition. Thereafter, the PET release films were separated, and a coating film was thus obtained. With a thickness gauge, the thickness of the coating film was measured to be 132 μm. The mass (M1) of the coating film was measured. Thereafter, the coating film was soaked in toluene and was taken out therefrom after 24 hours. The coating film was further washed with toluene, and toluene was removed in a vacuum dryer. The mass (M2) of the coating film after the removal of toluene was measured. The value calculated from (M2/M1)×100 was obtained as the gel fraction (%).

(Adhesive Strength Test)

A 130 μm thick pressure-sensitive adhesive tape (ASF-110 manufactured by CHUKOH FLO) was attached onto a stainless steel sheet in such a manner that a space 24 mm in width and 300 mm in length was formed. The active energy ray curable liquid composition was applied onto the space, and a 50 μm thick PET film (E5000 manufactured by TOYOBO CO., LTD.) was placed thereon. The stack was rolled with a laminate roller to spread the active energy ray curable composition. Next, UV rays were applied onto the PET film at 3000 mJ/cm$^2$ with use of UV irradiation device HTE-3000B INTEGRATOR 814M (manufactured by HI-TECH). Consequently, the active energy ray curable composition was cured to give a coating film. The coating film and the PET film were cut along the pressure-sensitive adhesive tape with a cutter knife. Thus, a test piece 24 mm in width and 300 mm in length was fabricated.

In accordance with JIS Z-0237, the test piece obtained was subjected to tension at an atmosphere temperature of 23° C., a relative humidity of 30%, a peeling angle of 180° and a stress rate of 300 mm/min with use of desktop precision universal tester AGS-X (manufactured by Shimadzu Corporation). The load required to peel the coating film from the stainless steel sheet was determined as the adhesive strength (the adhesive strength before hygrothermal treatment).

A test piece fabricated in the same manner was allowed to stand at an atmosphere temperature of 160° C. and a relative humidity of 90% for 30 minutes, and the adhesive strength was measured by the same method (the adhesive strength after hygrothermal treatment).

(Holding Strength Test)

A 130 μm thick pressure-sensitive adhesive tape (ASF-110 manufactured by CHUKOH FLO) was attached onto a release-treated side of a PET release film (K1504 manufactured by TOYOBO CO., LTD.) in such a manner that a space 12 mm in width and 150 mm in length was formed. The active energy ray curable composition was applied onto the space, and a 50 μm thick PET film (E5000 manufactured by TOYOBO CO., LTD.) was placed thereon. The stack was rolled with a laminate roller to spread the active energy ray curable composition. Next, UV rays were applied onto the PET film at 3000 mJ/cm² with use of UV irradiation device HTE-3000B INTEGRATOR 814M (manufactured by HI-TECH), thereby curing the active energy ray curable composition. After the UV irradiation, the coating film and the PET film were cut along the pressure-sensitive adhesive tape with a cutter knife, and the PET release film was separated. Thus, a test piece 12 mm in width and 150 mm in length was fabricated.

In accordance with JIS Z-0237, the time required for the test piece to be separated from a stainless steel sheet (the holding strength before hygrothermal treatment) was measured by the application of tension at an atmosphere temperature of 60° C., a relative humidity of 30% and a load of 1 kgf (9.8 N) with use of retentivity tester 145-D (manufactured by YASUDA SEIKI SEISAKUSHO LTD.).

A test piece fabricated in the same manner was allowed to stand at an atmosphere temperature of 160° C. and a relative humidity of 90% for 30 minutes, and the holding strength was measured by the same method (the holding strength after hygrothermal treatment).

Example 6

Polymerization was performed by the same procedures as in Example 5, except that the mixture added in the step (1) was changed to 17.0 ml of a mixture which contained 2.61 ml (10.4 mmol) of 1,1-dimethylpropane-1,3-diol dimethacrylate as a dimethacrylate (2) and 14.4 ml (135.2 mmol) of methyl methacrylate as a monomethacrylate, and that the mixture added in the step (3) was changed to 17.0 ml of a mixture which contained 2.61 ml (10.4 mmol) of 1,1-dimethylpropane-1,3-diol dimethacrylate as a dimethacrylate (2) and 14.4 ml (135.2 mmol) of methyl methacrylate as a monomethacrylate.

In the step (1), the rate of the consumption of 1,1-dimethylpropane-1,3-diol dimethacrylate and that of methyl methacrylate were 100%. The polymer obtained in the step (1) had Mn of 6,480 and Mw/Mn of 1.12. Further, the initiator efficiency (F1) in the step (1) was 95%.

In the step (2), the rate of the consumption of methyl methacrylate and that of n-butyl acrylate were 100%. The block copolymer obtained in the step (2) had Mn of 26,900 and Mw/Mn of 1.19. Further, the block efficiency (F2) between the step (1) and the step (2) was 70%.

In the step (3), the rate of the consumption of 1,1-dimethylpropane-1,3-diol dimethacrylate and that of methyl methacrylate were 100%. The block copolymer (X) obtained had Mn of 36,200 and Mw/Mn of 1.24.

An active energy ray curable composition was prepared using the block copolymer (X) in the same manner as in Example 5. The composition was subjected to the UV curability test, the adhesive strength test and the holding strength test. The test results are described in Table 2.

Comparative Example 1

The inside of a 300 ml pressure resistant reactor was dried and purged with nitrogen. There were added 0.676 g of copper bromide, 48.3 g of n-butyl acrylate, 8.47 g of acetonitrile and 0.339 g of diethyl 2,5-dibromoadipate, followed by stirring. The temperature was then increased to 75° C. Thereafter, 0.0816 g of pentamethyldiethylenetriamine (hereinafter, written as the triamine) was added and polymerization was initiated. When 95% of n-butyl acrylate was consumed, 57.0 g of toluene, 0.466 g of copper chloride, 19.7 g of methyl methacrylate and 1.35 g of 2-hydroxyethylmethacrylate were added. The reaction rate was controlled by appropriately adding the triamine. When the methyl methacrylate consumption rate was 82% and the 2-hydroxyethyl methacrylate consumption rate was 100%, the reaction was terminated by adding 71.4 g of toluene and also by performing cooling.

1.07 g of p-toluenesulfonic acid monohydrate was added to the polymerization reaction liquid, and the mixture was stirred at room temperature for 3 hours. The insoluble components that had been precipitated were removed by filtration, and 2.76 g of adsorbent KYOWAAD 500SH (manufactured by Kyowa Chemical Industry Co., Ltd.) was added. The mixture was further stirred at room temperature for 3 hours. The adsorbent was removed by filtration, and a colorless transparent solution was obtained. The solution was dried to remove the solvent and the residual monomers. The target block copolymer was thus obtained. The block copolymer obtained had Mn of 109,000 and Mw/Mn of 1.37.

The block copolymer was dissolved in toluene to give a 30% solution. A 300 ml separable flask was loaded with 100 g of the block copolymer solution and 1.41 g of triethylamine. The mixture was cooled in an ice water bath, and 1.25 g of acryloyl chloride was added thereto dropwise. The mixture was stirred for 2 hours. $^1$H-NMR measurement of a sample showed that the reaction rate was 70%.

The solution after the reaction was subjected to suction filtration two times in order to remove amine salts that had been precipitated. Next, toluene was removed from the filtrate by volatilization at room temperature. To remove residual amine salts, the filtrate was subjected to separation using chloroform and an aqueous sodium hydrogencarbonate solution. Specifically, the filtrate was purified two times in such a manner that the aqueous phase was disposed of and the chloroform phase was filtered with suction. Next, the chloroform phase was purified by being subjected to separation with saline solution three times. After the separation purification, magnesium sulfate was added to the organic phase to remove water. Lastly, chloroform and residual triethylamine and acrylic acid were removed by volatilization while increasing the temperature to 70° C. Thus, the target (meth)acrylic block copolymer having acryloyl groups was obtained. The (meth)acrylic block copolymer obtained had Mn of 111,000 and Mw/Mn of 1.37.

An active energy ray curable composition was prepared using the (meth)acrylic block copolymer in the same manner as in Example 5. The composition was subjected to the UV curability test, the adhesive strength test and the holding strength test. The test results are described in Table 2.

TABLE 2

|  |  | Ex. 5 | Ex. 6 | Comp. Ex. 1 |
|---|---|---|---|---|
| UV intensity | mJ/cm$^2$ |  | 3000 |  |
| UV curability (gel fraction) | % | 95 | 91 | 90 |
| Coating film thickness | μm | 132 | 134 | 130 |
| Hygrothermal treatment conditions | Temperature | °C. |  | 160 |  |
|  | Relative humidity | % RH |  | 90 |  |
|  | Time | min |  | 30 |  |
| Adhesive strength | Before hygrothermal treatment | N/10 mm | 4.6 | 4.2 | 5.4 |
|  | After hygrothermal treatment |  | 0.2 | 0.1 | 5.2 |
| Holding strength | Before hygrothermal treatment | Holding time (min) at 60° C. × 1 kgf | At least 300 | At least 300 | At least 300 |
|  | After hygrothermal treatment |  | 2 | 3 | At least 300 |

As shown in Table 2, the test pieces of Example 5 and Example 6 significantly decreased their adhesive strength and holding strength when exposed to hygrothermal conditions. Namely, excellent hygrothermal degradation properties were demonstrated. In contrast, the test piece of Comparative Example 1 exhibited very poor hygrothermal degradation properties with little change in adhesive strength or holding strength under hygrothermal conditions.

The above results have shown that the block copolymers (X) of the invention have excellent hygrothermal degradation properties.

The invention claimed is:

1. A (meth)acrylic block copolymer, comprising:
   a methacrylic polymer block (A) having at least one active energy ray curable group represented by formula (1) and comprising structural units derived from a dimethacrylate according to formula (2) and a monomethacrylate:

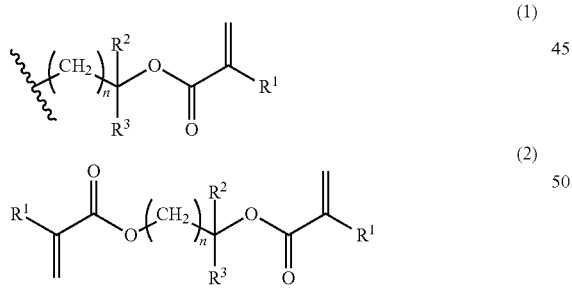

(1)

(2)

where R$^1$ is a methyl group, R$^2$ and R$^3$ are each independently a hydrocarbon group having 1 to 6 carbon atoms, and n is an integer of 1 to 5; and
   a (meth)acrylic polymer block (B) having no active energy ray curable groups;
   wherein:
   the methacrylic polymer block (A) has a number average molecular weight of at least 1,000; and
   the (meth)acrylic polymer block (B) has a number average molecular weight of at least 3,000.

2. A process for producing the meth(acrylic) block copolymer according to claim 1, the process comprising: anionically polymerizing a methacrylate ester in the presence of an organolithium compound, a tertiary organoaluminum compound and at least one Lewis base selected from the group consisting of ethers and tertiary polyamines, then
   adding and anionically polymerizing a mono(meth)acrylate;
   wherein:
   the methacrylate ester comprises 5 to 80 mol % of a dimethacrylate represented by Formula (2) and 95 to 20 mol % of a monomethacrylate:

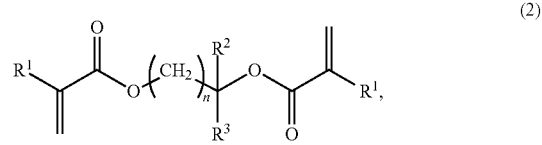

(2)

where R$^1$ is a methyl group, R$^2$ and R$^3$ are each independently a hydrocarbon group having 1 to 6 carbon atoms, and n is an integer of 1 to 5, and
   the tertiary organoaluminum compound is represented by Formula (3-1) or (3-2):

(3-1)

where R$^4$ is a monovalent saturated hydrocarbon group, a monovalent aromatic hydrocarbon group, an alkoxy group, an aryloxy group, or an N,N-disubstituted amino group, and R$^5$ and R$^6$ are each independently an aryloxy group or are bonded to each other to form an arylenedioxy group;

(3-2)

where R$^7$ is an aryloxy group, and R$^8$ and R$^9$ are each independently a monovalent saturated hydrocarbon group, a monovalent aromatic hydrocarbon group, an alkoxy group or an N,N-disubstituted amino group.

3. The process according to claim 2, wherein anionically polymerizing the mono(meth)acrylate comprises adding and anionically polymerizing a monoacrylate after the adding and the anionically polymerizing of the monomethacrylate.

4. The process according to claim 2, further comprising:
   repeating the adding and the anionically polymerizing of the methacrylate esters after the adding and the anionically polymerizing of the mono(meth)acrylate.

5. An active energy ray curable composition comprising the (meth)acrylic block copolymer according to claim 1.

6. The process according to claim 3, further comprising:
   repeating the adding and the anionically polymerizing of the methacrylate after the adding and the anionically polymerizing of the monoacrylate.

7. The (meth)acrylic block copolymer according to claim 1, wherein:
   the methacrylic polymer block (A) has a number average molecular weight of 1,000 to 1,000,000; and
   the (meth)acrylic polymer block (B) has a number average molecular weight of 3,000 to 5,000,000.

8. The (meth)acrylic block copolymer according to claim 7, wherein a mass ratio of the methacrylic polymer block (A) to the (meth)acrylic polymer block (B) in the copolymer is 90:10 to 5:95.

9. The (meth)acrylic block copolymer according to claim 8, wherein the dimethacrylate according to formula (2) is 1,1-dimethylpropane-1,3-diol dimethacrylate.

10. The (meth)acrylic block copolymer according to claim 1, wherein:

the methacrylic polymer block (A) has a number average molecular weight of 1,000 to 300,000; and the (meth)acrylic polymer block (B) has a number average molecular weight of 5,000 to 1,000,000.

11. The (meth)acrylic block copolymer according to claim 10, wherein a mass ratio of the methacrylic polymer block (A) to the (meth)acrylic polymer block (B) in the copolymer is 90:10 to 5:95.

12. The (meth)acrylic block copolymer according to claim 11, wherein the dimethacrylate according to formula (2) is 1,1-dimethylpropane-1,3-diol dimethacrylate.

* * * * *